May 26, 1942.  H. CHRISMAN  2,284,511
METER SEAL
Filed Aug. 23, 1939
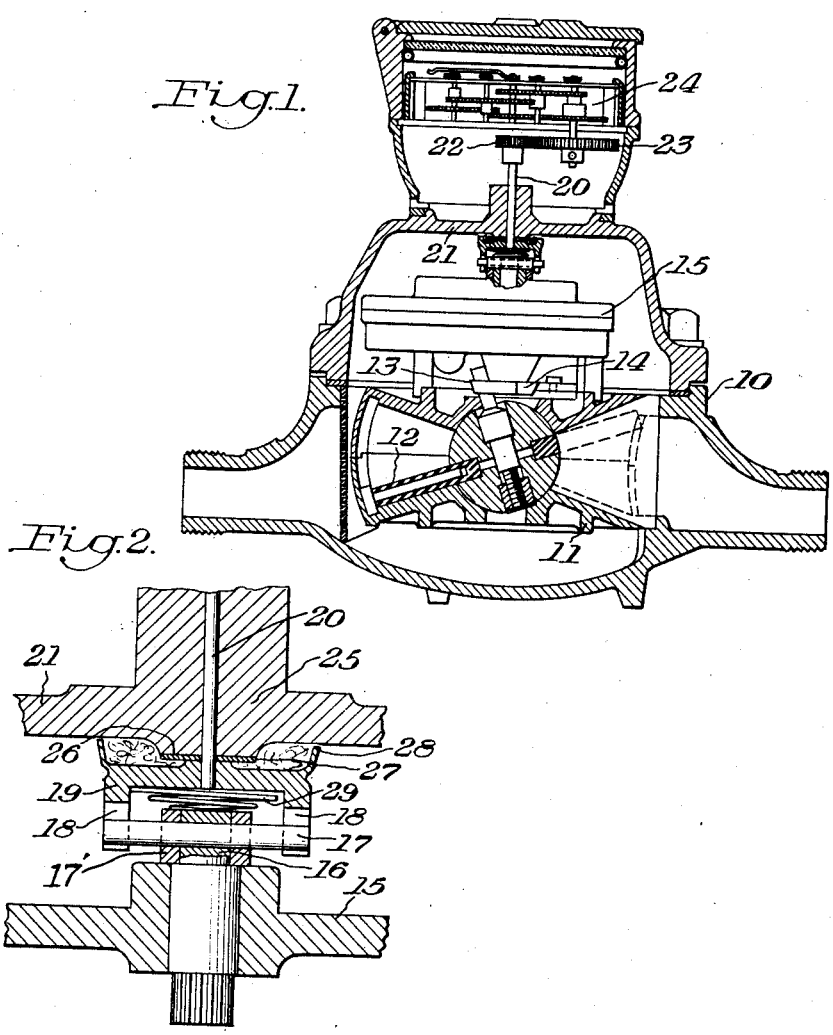
INVENTOR.
Horace Chrisman.
BY
Lewis D. Knigeford
ATTORNEY.

Patented May 26, 1942

2,284,511

UNITED STATES PATENT OFFICE 2,284,511

METER SEAL

Horace Chrisman, Edgewood, Pa., assignor to Pittsburgh Equitable Meter Company, Pittsburgh, Pa., a corporation of Pennsylvania Application August 23, 1939, Serial No. 291,557

2 Claims. (Cl. 73—272)

This invention relates to improvement in liquid meters, and relates particularly to improved means for sealing the register chamber from the meter chamber.

In meters for the measurement of liquids, particularly of the nutating disc type, heretofore a stuffing box has been provided between the reduction gearing and register to prevent leakage from the gearing chamber into the register case. The disadvantage accompanying the use of a stuffing box of conventional construction at this point is that any variation in frictional resistance to turning of the register spindle by the stuffing box will affect the accuracy of the meter, and furthermore a stuffing box of this type has the disadvantage that it produces a considerable drag or resistance to turning of the meter, which interferes with accurate operation. In an attempt to minimize these disadvantages, it has been the practice to apply the stuffing box to the slowest moving spindle of the gear train.

In accordance with the present invention, I provide a sealing member between the gear train case and the register case comprising a rotating member abutting a sealing surface and held in engagement therewith by a spring that rotates with said rotating member. A washer of rawhide or other soft, porous material is inserted between the rotating member and sealing surface. Preferably, a supply of lubricant is provided adjacent the periphery of the rotating member in a cup which is mounted on the register driving spindle and is rotated from the reduction gearing by a suitable dog and crank arrangement or any other suitable structure. The rotating member is maintained in engagement with the sealing surface by means of a spring which rotates with the rotating member. The cup shape of the lubricant containing member maintains the lubricant in position without danger of being spilled or washed away.

The invention will be described in detail in connection with the accompanying drawing, wherein I have shown a preferred embodiment of the invention by way of example, and wherein Figure 1 is a view in vertical section of a meter having my invention applied thereto, and Figure 2 is an enlarged vertical section of a detail of Figure 1.

Referring to the drawing, there is shown a water meter casing indicated generally by the numeral 10 having a meter chamber 11 therein with a nutating disc 12 in the chamber which drives the spindle 13 in known manner. The spindle 13 drives a dog 14 which in turn drives the reduction gearing mounted in case 15, the last element of the gear train having a spindle 16 extending from the case. Spindle 16 at its outer end carries a pin or driving dog 17 passing through a thrust collar 17' and engages in the slots 18 of a driven crank member 19 secured on a shaft 20 passing through a dividing wall 21 of the case and having a gear 22 at its upper end meshing with the gear 23 which drives the register train 24. The wall 21 has a downwardly projecting boss 25 providing a sealing surface 26 which is accurately machined. The driven dog 19 carries a washer 27 of rawhide or other suitable material in engagement with the surface 26 of boss 25, the washer 27 being surrounded by a cup 28 containing a suitable fluid or viscous lubricant. Preferably the flange or upper margin of the cup 28 extends above the plane of the washer 27 so as to maintain the body of lubricant adjacent the washer and the surfaces abutting the washer. A spring 29, which is shown as of tapered helical form, abuts the driven crank member 19 at one end and abuts shaft 16 at the other end, and thus maintains the rawhide washer 27 in sealing engagement with the surface 26 of boss 25.

The construction above described seals the register driving spindle 20 against leakage without undue friction. Due to the porosity of the rawhide washer, a certain amount of lubricant is conveyed to the surface 26 and to the journal of spindle 20, but no liquid is permitted to pass therethrough due to the presence of lubricant in the surrounding cup. In operation the pressure inside case 10 holds the washer 27 in sealing engagement with surface 26. However, the spring 29 is provided to insure contact of the sealing surfaces at all times, and therefore need be only very light. The spring thus maintains contact between the sealing members even when the meter is not in service. A further advantage is that the resistance to turning of the seal remains substantially constant and cannot be changed by any exterior adjustment.

It will be apparent that various modifications may be made in the invention without departing from the spirit or scope thereof, as the modification herein described is intended to be illustrative only of the invention. What I claim as my invention and desire to secure by Letters Patent is:

1. In a fluid meter comprising a meter casing containing a metering element and a reduction gear train driven thereby, a register case divided by a wall from said meter casing and a register driving spindle driven by said gear train passing through said dividing wall the improvement wherein said dividing wall has a sealing surface, a sealing washer surrounding said spindle and engaging said sealing surface, means driven from said gear train backing said washer, spring means between said gear train and backing means for urging said washer into engagement with said sealing surface, and a cup carried by said spindle having a flange extending above and surrounding said washer for containing lubricant.

2. In a fluid meter comprising a meter casing containing a metering element and a register case divided by a wall from said meter casing, the improvement wherein said wall has a sealing surface, a register driving spindle driven by said metering element passing through said dividing wall and having an abutting surface, a sealing washer of soft porous material interposed between said sealing surface and abutting surface and a cup having a flange extending above and surrounding said washer and rotatable with said spindle for containing lubricant.

HORACE CHRISMAN.